3,329,826
DIRECT PRODUCTION OF ESTERS FROM ORGANIC ACIDS
Lloyd Albert Pine, Henry George Ellert, and Harry Vernon Drushel, Baton Rouge, La., assignors to Esso Research and Engineering Company, a corporation of Delaware
No Drawing. Filed July 26, 1963, Ser. No. 297,946
7 Claims. (Cl. 260—410.6)

This invention relates to a process for the direct production of esters from organic acids. More particularly, this invention relates to a process for forming esters by reacting a carboxylic acid with an alcohol.

Heretofore, it has been known to the prior art that the carboxyl group of fatty acids is accessible to reduction and such reduction can lead to the production of alcohols corresponding to the fatty acids or, under certain conditions, to the production of esters from such acids. Thus, it has been proposed to reduce the carboxyl group of fatty acids at high pressures over suitable catalysts with formation of the corresponding alcohols, or their esters, of the acids employed. The state of the art in this regard, however, shows that certain inherent disadvantages are present in the known processes. For example, the prior art processes produce yields of the desired esters in substantially less than satisfactory amounts. Further, the processes of the prior art are somewhat limited in the production of esters directly from carboxylic acids, which acids are branched in nature, for example, branched acids referred to as the "Koch" or "neo acids."

It is an object of the present invention, therefore, to provide a process for the direct production of esters from carboxylic acids and alcohols. It is a special object to provide a process for the production of esters from carboxylic acids and alcohols wherein said acids and alcohols are branched in nature. Other objects will appear hereinafter.

The objects of this invention are accomplished by the following process of preparing esters which comprises contacting an organic acid, i.e., an acid having one or more carboxyl radicals, with an alcohol in the presence of a molybdenum-containing catalyst, with said reaction most preferably being effected in the liquid phase. Accordingly, it has now been found that molybdenum catalysts selectively catalyze the reaction of carboxylic acids with alcohols to form esters corresponding to said carboxylic acids and said alcohols in number of carbon atoms and configuration of carbon chains and substituent groups. Thus, without any intent of limiting the scope of the present invention, the reaction between a fatty acid and a monohydroxyl alcohol can be illustrated in accordance with the following equation:

wherein R and R' may be the same or different.

In general, any organic acid, or its anhydride can be reacted with the alcohol reactant to produce the esters of the present invention. Organic acids containing substituent groups such as keto groups, nitro groups, halogen atoms, etc., are also applicable herein. The organic acid reactant can be a branched chain, straight chain or cyclic, saturated or unsaturated organic acid. Similarly, such acid may be an aliphatic or aromatic, monobasic, dibasic, tribasic, etc. acid. Accordingly, when the term "organic acid" is used herein, it must be clearly understood that the term embraces organic acids, organic acid anhydrides and derivatives thereof. Thus, the organic acids suitable for use in the process of the present invention are the organic acids, for example, the saturated aliphatic monocarboxylic acids, saturated aliphatic dicarboxylic acids, aromatic acids, hydroxy acids, keto acids, amino acids and the like, having from 1 to about 30 carbon atoms and preferably those having from 3 to 20 carbon atoms.

Non-limiting examples of suitable saturated aliphatic monocarboxylic acids include propionic, butanoic, valeric, caprylic, capric, lauric, myristic, stearic, carnaubic, isobutyric, pivalic, 2-ethylbutanoic, 2-ethylhexanoic, and the like, their anhydrides and derivatives.

Suitable saturated aliphatic dicarboxylic acids are, for example, succinic, glutaric, adipic, pimelic, sebacic, and the like, their anhydrides and derivatives.

Suitable aromatic acids includes, by way of example, benzoic, phthalic, terephthalic and the like; keto acids include acetoacetic, pyruvic, levulinic, α-oxo-capric, α-acetyl-caproic acid and the like.

As mentioned above, the present invention is surprisingly effective in the preparation of highly hindered esters from branched carboxylic acids, such esters being heretofore synthesized from the corresponding acid chloride or mineral acid complex. Illustrative of the branched carboxylic acids suitable for use in the process of the present invention are those produced from olefins, carbon monoxide and water in the presence of acidic catalysts. These acids can be produced directly from the foregoing reactants, that is, in a one-step process. An alternate to the one-step method is a reaction carried out in two steps; in the first step, the olefin and carbon monoxide are reacted in the presence of an acidic catalyst, essentially in the absence of water, to form an intermediate, hydrolyzable reaction product which is thereafter hydrolyzed in the second stage to liberate the desired carboxylic acid product and the acidic catalyst. Such branched carboxylic acid products may be represented by the structural formula:

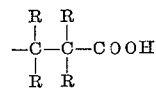

wherein R indicates hydrogen or a substituted or unsubstituted similar or dissimilar alkyl or aralkyl group. Examples of the branched acids produced are: 2,2,3-trimethylbutanoic acid, 2,2-dimethylpentanoic acid, 2-ethyl 2-methylbutanoic acid, and the like.

In general, any organic alcohol can be reacted with the above acid reactants to produce the products of the present invention. Thus, suitable alcohols include the primary, secondary and tertiary aliphatic, aromatic and heterocyclic mono- and polyhydroxyl alcohols. While secondary and tertiary alcohols are operable in the process of the present invention, they are found to be less desirable than the primary alcohols because of their stronger tendency to dehydrate to olefins. Such alcohols may contain from 1 to about 30 carbon atoms and preferably containing from 3 to 20 carbon atoms.

Non-limiting examples of suitable alcohols include methyl and ethyl alcohol, the linear and branched propyl-, butyl-, amyl-, hexyl-, heptyl-, octyl-, nonyl-, decyl-, dodecyl-, cetyl-, carnaubyl- alcohols and the like. Suitable dihydroxy aliphatic alcohols include the glycols and the pinacols; suitable trihydroxy aliphatic alcohols include the glycerols; and suitable polyhydroxy aliphatic alcohols include the tetritols, for example, erythrol, pentaerythritol and the like. Examples of the cyclic alcohols are cyclopentanol, cyclohexanol, cycloheptanol, cyclo-octanol and the like.

The present invention may be applied to a specific acid and alcohol of the foregoing classes or mixtures of acids and/or alcohols.

In accordance with the present invention, a catalyst is provided which is not only more active than catalysts heretofore known for the direct esterification of carboxylic acids and alcohols, but is also surprisingly effective for the direct production of esters from highly branched and thus hindered carboxylic acids and alcohols. The catalyst employed in the practice of the present invention is suitably a molybdenum-containing catalyst wherein the sole essential active catalyst material is a molybdenum compound (wherein molybdenum has a valence of 2 to 6), such as molybdenum sulfide ($MoS_2$). Other molybdenum-containing catalysts which may be employed include by way of example, molybdenum oxide, sulfided cobalt molybdate, molybdenum blue ($MoO_3$) and the like. These catalysts are truly selective in that the above objects relative to direct esterification are accomplished. Furthermore, the molybdenum-containing catalysts used in the process of the instant invention are extremely stable and can be used for protracted periods without apparent loss of activity. For example, it has been found in experimental runs that the activity of said catalysts showed no measurable decline after being used over 700 hours. This property is in contrast to the prior art catalysts which are, in general, not stable under the conditions found in the present process and therefore rapidly lose activity with use. Illustrative of this are copper chromite catalysts which are found to be particularly unstable to the water formed during the reaction in the present process.

The catalysts used in the present invention may, of course, be supported on inert carriers of any of the readily available types. Thus, examples of carrier materials which may be used as solid support components of the catalysts are the various aluminous and siliceous materials of natural or synthetic origin such as bauxite, aluminum oxide, activated alumina, Kieselguhr, magnesium oxide, magnesium silicate, magnesium carbonate, barium sulphate, pumice, kaolin, activated carbon, clays, Carborundum, Alundum, and the like. The non-acidic or weakly acidic carriers are preferred so as to minimize acid catalyzed alcohol dehydration. The catalysts preferably contain 2–25 wt. percent of the active material supported on a carrier of the type above described, e.g., activated carbon. A preferred molybdenum-containing catalyst is molybdenum sulfide having the following general composition: 5–15 wt. percent, preferably 8–10 wt. percent, e.g., 9 wt. percent molybdenum oxide on a carrier of the type above described, e.g., activated carbon, sulfided to saturation with $H_2S$.

The reaction conditions employed in the process, whether said process is a batch or continuous operation, are as follows:

Temperature, 200 to 600° F., preferably 300 to 500° F., for example, 400° F.

Holding times, 0.2 to 10 hours, preferably 1 to 4 hours, for example, 2 hours.

While elevated pressures are not critically necessary for this process, sufficient pressure, e.g. 50 to 500 p.s.i.g. is usually employed so as to retain at least a portion of the reactants in the liquid phase. The amount of supported catalyst utilized is from 10 to 100 weight percent, preferably 40 to 60 weight percent, for example, 50 weight percent, based on the total reactants, i.e., acid plus alcohol supplied. If a continuous esterification operation is employed, feed rates of reactants over supported catalyst of 0.1 w./hr./w. to 3.0 w./hr./w. are utilized. Since the sole essential active catalyst (molybdenum compound) constitutes from 2 to 25 wt. percent of the sum of active catalyst plus substrate (supported catalyst), the concentration of the sole essential active catalyst based on the total reactants ranges from 0.2 wt. percent to about 25 wt. percent and preferably from 0.8 to 15 wt. percent. The acids and alcohols are preferably employed in substantially equimolar amounts; however, the presence of large molar excesses of one of the reactants is found to have no deleterious effects. It is to be noted here that the present process may be carried out substantially in the absence of, or in the presence of small amounts of hydrogen.

The esters produced by the present invention are highly desirable and, in general, are suitable for use in the manufacture or synthesis of detergents, of emulsifying or setting agents, waxes, lubricants, drying compositions, and the like.

Specific application of the process of the present invention are further illustrated by the examples which follow.

*Example 1*

In order to illustrate a batch reaction of a carboxylic acid and an alcohol, the ester of 2-ethylhexanoic acid and 2-ethylhexanol was produced. In this experiment 35.1 grams of the acid and 66.6 grams of the alcohol were charged to a reaction vessel and heated at atmospheric pressure for a period of 2.5 hours, and at temperatures between 350 to 396° F. over 50 ml. of pelletized molybdenum sulfide on activated carbon. The reaction was driven to completion by removal of water formed as an azeotrope. At the end of the reaction period 94.1 mole percent of the acid had been converted to the corresponding ester, with a selectivity of 100 mole percent.

*Examples 2 to 10*

In a manner similar to that of Example 1, a number of experiments were run utilizing various acids, alcohols and reaction conditions as hereinafter tabulated in Table I. As in Example 1, 50 ml. of pelletized molybdenum sulfide on activated carbon was employed as catalyst. Total charge of organic material was about 100 ml. with the lower boiling reactant in approximately 10 mole percent excess. Water of esterification was removed as an azeotrope.

TABLE I

| Example No. | Reactants | | Temp., °F. | Time, hrs. | Conv., mole percent | Selectivity to Ester, mole percent |
| --- | --- | --- | --- | --- | --- | --- |
| | Acid | Alcohol | | | | |
| 2 | Pivalic | n-Heptyl | 248–334 | 5 | 91.4 | 100 |
| 3 | do | 2-ethylhexyl | 320–360 | 5 | 92.5 | 100 |
| 4 | do | Neo-decyl (crude) | 400 | 8 | 85 | High |
| 5 | Neo-heptanoic | Neo-heptyl | 260–341 | 20 | 55 | 100 |
| 6 | 2-ethylhexanoic | 2-octyl | 250–363 | 3 | 45 | 63 |
| 7 | n-Decanoic | Pentaerythritol | 370–518 | 2.5 | 90 | [1] 95 |
| 8 | Succinic | n-Heptyl | 329–422 | 4.2 | 97.3 | [2] 98 |
| 9 | Benzoic | do | 374–422 | 5.0 | 93 | 97 |
| 10 | Succinic anhydride | do | 348–390 | 2.5 | 100 | [2] 92.5 |

[1] To tetra ester. [2] To diester.

*Example 11*

In a manner similar to that of Example 1, 2-ethylhexanoic acid and 2-ethylhexanol are heated at a temperature of about 350° F. at atmospheric pressure and for a period of about 2.5 hours over 50 ml. of pelletized molybdenum oxide on activated carbon. The reaction is driven to completion by removal of water formed as an azeotrope. At the end of the reaction period substantially all of the acid is converted to the corresponding ester.

*Examples 12 to 18*

In order to illustrate a continuous esterification reaction of a carboxylic acid and an alcohol, a series of experiments was run in which the ester of neo-heptanoic acid and methanol was produced. In each of these runs the feed comprised an equal volume of the acid with the alcohol. Each of the runs was made under 150 p.s.i.g. in order to maintain a liquid phase in the reactor and was isothermal at the temperature reported in the following Tables II and III. In Examples 12 to 14 of Table II, the catalyst comprised 250 cc. of molybdenum sulfide on carbon; in Examples 15 to 18 of Table III, the catalyst comprised 250 cc. of sulfided cobalt molybdate on carbon.

TABLE II.—MOLYBDENUM SULFIDE ON CARBON CATALYST

|  | Example 12 | Example 13 | Example 14 |
| --- | --- | --- | --- |
| Catalyst Age, hours on feed | 107–114 | 114–131 | 442–466 |
| Feed Rate, v./v./hr | 0.25 | 0.27 | 0.28 |
| Temperature, °F | 401 | 401 | 402 |
| Conversion of Acid, mole percent | 95.6 | 92.0 | 100 |
| Selectivity to Ester, mole percent | 100 | 100 | 100 |

TABLE III.—SULFIDED COBALT MOLYBDATE ON CARBON CATALYST

|  | Example 15 | Example 16 | Example 17 | Example 18 |
| --- | --- | --- | --- | --- |
| Catalyst Age, hours on feed | 149–153 | 314–318 | 338–342 | 687–711 |
| Feed Rate, v./v./hr | 0.28 | 0.40 | 0.48 | 0.51 |
| Temperature, °F | 400 | 450 | 451 | 450 |
| Conversion of Acid, mole percent | 89.4 | 99.9 | 99.9 | 98.1 |
| Selectivity to Ester, mole percent | 99.9 | 99.9 | 99.9 | 99.7 |

What is claimed is:

1. A process for producing esters which comprises contacting an organic acid having from 1 to 30 carbon atoms and selected from the group consisting of saturated organic acids having at least one carboxyl group and unsaturated organic acids having at least one carboxyl group with a saturated organic alcohol having from 1 to 30 carbon atoms and from 1 to 3 hydroxyl groups at temperatures of from about 200 to 600° F. in the presence of a molybdenum-containing catalyst containing a catalytic amount of a molybdenum compound as the sole essential active catalyst material, said molybdenum compound being selected from the group consisting of molybdenum sulfide and sulfided cobalt molybdate.

2. A process as in claim 1 in which the concentration of said sole essential active catalyst material based upon total reactants ranges from about 0.2 to about 25 wt. percent.

3. A process as in claim 1 in which said sole essential active catalyst is supported on an inert carrier, and the concentration of said sole essential active catalyst based upon the total of said sole essential active catalyst plus said inert carrier ranges from 2 to 25 wt. percent.

4. A process for the direct production of esters which comprises contacting a $C_3$ to $C_{20}$ organic acid selected from the group consisting of saturated organic acids having at least one carboxyl group and unsaturated organic acids having at least one carboxyl group with about equimolar amounts of a saturated $C_3$ to $C_{20}$ organic alcohol having from 1 to 3 hydroxyl groups at temperatures of from about 200 to 600° F. substantially in the liquid phase in the presence of a supported catalyst containing as the sole essential active catalyst a molybdenum compound selected from the group consisting of molybdenum sulfide and sulfided cobalt molybdate, and wherein the concentration of said sole essential active catalyst based upon the total of said organic acid plus said organic alcohol ranges from 0.2 to about 25 wt. percent.

5. A continuous process for the direct production of esters which comprises continuously contacting a $C_1$ to $C_{30}$ organic acid selected from the group consisting of saturated organic acids having at least one carboxyl group and unsaturated organic acids having at least one carboxyl group with about equimolar amounts of a saturated $C_1$ to $C_{30}$ organic alcohol having from 1 to 3 hydroxyl groups at temperatures of from about 200 to 600° F. substantially in the liquid phase in the presence of a supported molybdenum-containing catalyst containing from 2 to 25 wt. percent of a molybdenum compound selected from the group consisting of molybdenum sulfide and sulfided cobalt molybdate as the sole essential catalyst material based on the total of molybdenum compound plus support, said reactants, organic acid plus organic alcohol, being introduced at feed rates of from 0.1 to 3.0 weight parts of reactants/hour/weight part of supported catalyst.

6. A process as in claim 5 in which said support is activated carbon.

7. A process for the direct production of hindered organic esters which comprises contacting a branched $C_3$ to $C_{20}$ organic acid selected from the group consisting of saturated organic acids having at least one carboxyl group and unsaturated organic acids having at least one carboxyl group branched organic acids with a primary, monohydroxy, saturated organic alcohol having from 3 to 20 carbon atoms and selected from the group consisting of unbranched and branched organic alcohols at temperatures of 300 to 500° F. in the presence of a catalytic amount of a molybdenum compound selected from the group consisting of molybdenum sulfide and sulfided cobalt molybdate.

References Cited

UNITED STATES PATENTS

| 1,819,818 | 8/1931 | Jaeger | 260—476 |
| 2,521,742 | 9/1950 | Paterson | 260—410.9 |
| 2,965,660 | 12/1960 | Heise et al. | 260—410.9 |

OTHER REFERENCES

Andrianova et al.: Chemical Abstracts, vol. 55, (1961), p. 15075.

ALEX MAZEL, *Primary Examiner.*

ANTON H. SUTTO, *Assistant Examiner.*